Jan. 27, 1925.
A. T. DEWEY
1,524,172
HOSE REEL
Filed Feb. 12, 1921
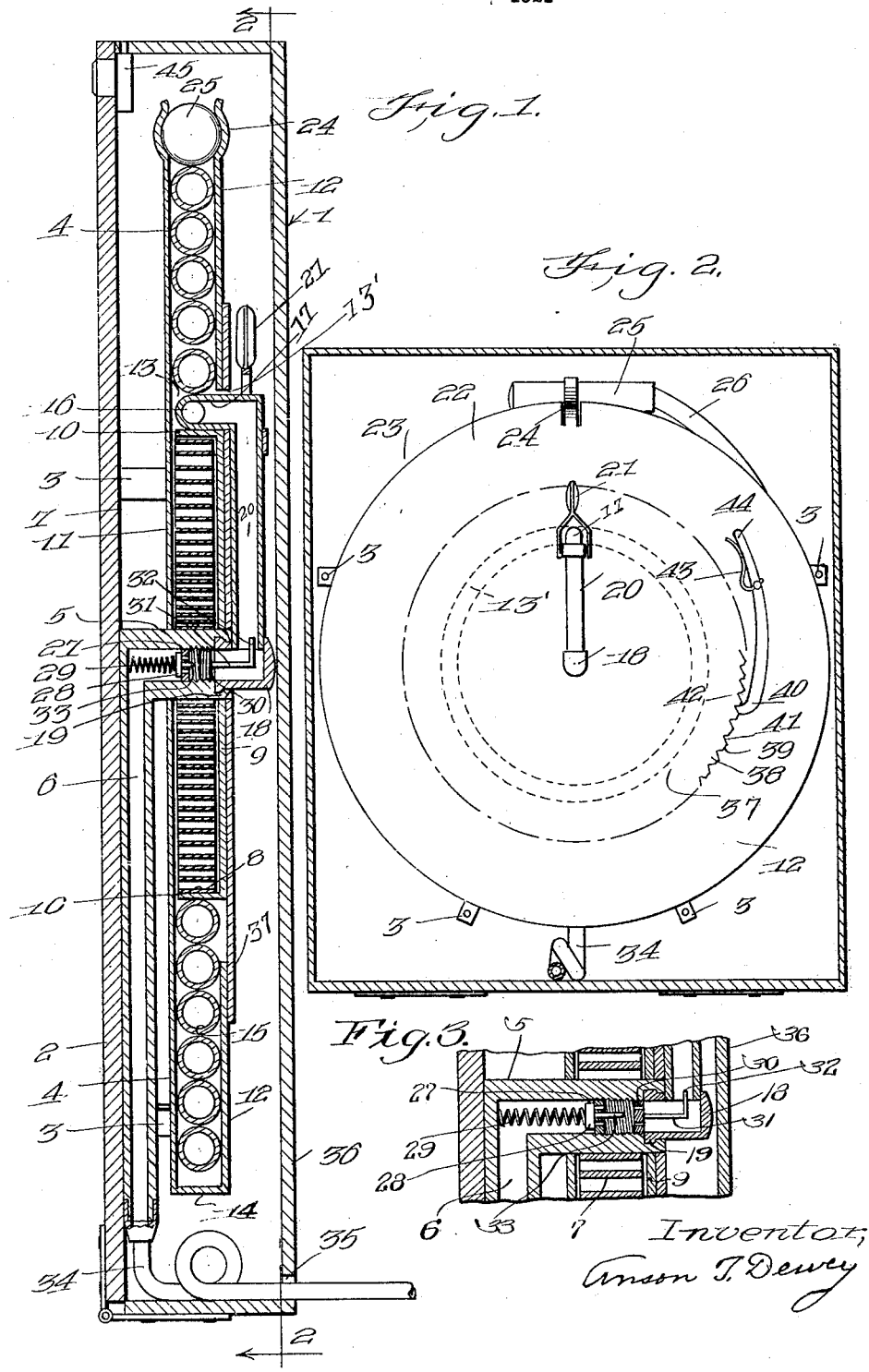
Inventor;
Anson T. Dewey Patented Jan. 27, 1925.

1,524,172

UNITED STATES PATENT OFFICE.

ANSON T. DEWEY, OF CHICAGO, ILLINOIS.

HOSE REEL.

Application filed February 12, 1921. Serial No. 444,552.

*To all whom it may concern:*

Be it known that I, ANSON T. DEWEY, a citizen of the United States, residing at Chicago, in the county of Cook and State of Illinois, have invented certain new and useful Improvements in Hose Reels, of which the following is a specification.

This invention relates to a reel for winding flexible tubing and has for its object to provide means for conveniently carrying an inflating tubing in an automobile.

Another object of the invention is to provide an air tube upon which a reel is rotatably mounted.

Another object of the invention is to provide an air tube for supporting a rotatable reel, automatic means for winding said reel and manual means whereby said reel may be wound, and means for controlling an air vavle in said tube.

With the above and other objects in view, I have invented a device illustrated in the accompanying drawings in which—

Figure 1 is a longitudinal central sectional view of my device.

Figure 2 is a section on line 2—2 thereof on a reduced scale, and

Figure 3 is an enlarged detail sectional view of the valve structure and operating means therefor.

Like reference characters indicate like parts throughout the following specification and in several views in the drawings in which 1 is a reel case having a hinged door 2 to the inner surface of which is fixedly mounted by means of brackets 3 a reel member 4, through which the right angular extension 5 of the air pipe 6 projects. Fixed at its inner end to the member 5 is a clock spring 7 which is wound about upon said member and has its outer end 8 fixed to the rotatable reel member 9 which is rotatably mounted upon said member 5 and has an annular inturned flange 10 seating around said spring 7. A casing, circular in form, is supported from the hinged door 2 by means of brackets 3 and its wall 12 which is spaced from the wall 11 is of ring form of which the inner peripheral edge is overlapped by a circular plate carried by the rotatable member 9. The wall 12 is provided with an opening 13. There is thus formed an annular channel between the walls 11 and 12. The walls 11 and 12 are connected about two-thirds the way therearound by flange or side wall 14, the space between the walls 11 and 12 being opened for the balance of the circumference thereof to permit of the running off or on of the rotatable reel member 9 of a flexible tubing 15, the inner end 16 of which is connected to a rigid tube 17 which projects through said channel 13' and turns at right angles and extends to the center of said reel and is connected by a swivel joint 18 to the end 19 of the member 5. Hingedly mounted to a line with the body portion 20 of the member 17 is a handle 21 which may be turned at right angles to the part 20 and used as a means for manually rotating the reel member 9, if such an expediency should become necessary. On the open part 22 of the casing 23 formed by said walls 11 and 12 is provided a clip 24 for holding the inflating and safety gauge member 25 secured to the end 26 of said hose 15.

Mounted within the tubular member 5 is an air valve 27 having a valve member 28 controlled by a spring 29. Threadedly movable in said part 5 is a perforated disc 30 to which is fixed a stem 31 having a right angular end 32 extending into the part 20 of the tube 17, so that upon rotation of said member 20 in one direction, the stem 31 is caused to rotate to screw the perforated disc in against stem 33 of the valve 28, thus opening the valve to permit passage of air from the tube 6 to the tube 20 and thence to the hose 15. Upon rotation of the member 20 in the opposite direction, as when winding the hose on the reel member 9, the disc 30 will be caused to unscrew away from the valve stem 33 permitting the seating of valve member 28 and closing off of the passage of air from the tube 6 to the tube 20. To the lower end of the tube 6 is connected a flexible tube 34 one end of which extends through the opening 35 in the wall 36 of the casing 1 and is adapted to be connected at any suitable point to an air compressor. Fixedly mounted on the member 9 to rotate therewith is a disc 37 the peripheral edge of which is provided with teeth 38 having inclines 39. These teeth are adapted to be engaged by the dog 40 pivoted on the wall 12. The inclination of said parts 39 relative to the inclinations 41 of the teeth 38 is such that upon rapid movement of the reel the dog will skim over said teeth and not reach the inner recesses 42 of the space therebetween, thus permitting rapid winding of the reel. However, upon slow rotation thereof, the dog will catch said teeth and stop movement of the reel, this action being similar to that of the operation of a shade roller. As the position of the case 1 may be such that the dog 40 will not operate by gravity, I have provided a very light spring 43, to bear upon the outer end 44 of said dog 40 to force the same into engagement with said teeth 38. A lock 45 is mounted on the door 2 to hold the same closed when the reel is not in use. Obviously when it is desired to use the reel, the door 2 must be swung to a position perpendicular to the reel case 1.

Having described my invention, that which I claim is new and desire to procure by Letters Patent is:

1. In a device of the character described, a base, a rigid pipe carried thereby, said pipe having a right angular end portion, a spring pressed valve located within said end portion, a reel mounted on said end portion, a rigid pipe carried by the reel and having a swivel connection with said end portion, means whereby the rotation of the reel operates the valve, said reel being automatically rewindable, and a flexible air hose wound upon the reel and having connection with said second mentioned rigid pipe, said means comprising a screw threaded within said end portion and said valve having a stem lying within the path of movement of the screw.

2. In a device of the character described, a base, a rigid pipe carried thereby and having a right angular end portion, a spring pressed valve located within said end portion, a reel mounted on said end portion, a rigid pipe carried by the reel and having a swivel connection with the said end portion, means whereby the rotation of the reel operates the valve, said reel being automatically rewindable, and a flexible air hose mounted upon the reel and having connection with the second mentioned rigid pipe, said means consisting of a screw threaded within said end portion, said spring pressed valve having a stem lying within the path of movement of the screw, and means for rotating the screw.

3. In a device of the character described, a base, a rigid pipe carried thereby and having a right angular end portion, a spring pressed valve located within said end portion, a reel mounted on said end portion, a rigid pipe carried by the reel and having a swivel connection with said end portion, means whereby the rotation of the reel operates the valve, said reel being automatically rewindable, a flexible air hose wound upon the reel and having connection with said second mentioned rigid pipe, said means consisting of a screw threaded within said end portion and said valve having a stem within the path of movement of said screw, and means for rotating the screw and consisting of a stem carried by the screw and having an angularly disposed end portion projecting into the second mentioned rigid pipe.

4. In a device of the character described, a base, a rigid pipe carried thereby, said pipe having a right angular end portion, a spring pressed valve within said end portion and a reel mounted upon said end portion, a rigid pipe carried by the reel and having a swivel connection with the said end portion, means whereby the rotation of the reel operates the valve, said reel being automatically rewindable, a flexible air hose wound upon the reel and having connection with said second mentioned rigid pipe, said means consisting of a screw threaded within said end portion and said valve having a stem lying within the path of movement of said screw, and means for rotating the screw, said means consisting of a stem carried by the screw and having a right angular end portion projecting into the said second mentioned rigid pipe, said second mentioned rigid pipe forming a crank whereby the reel may be manually rotated.

5. A device for the purpose indicated comprising a reel and a hose carried thereby, a fluid conductor terminally connected with said hose, a spring seated valve within said fluid conductor, the reel being rotatably mounted, a perforated disk threadingly mounted interiorly of said conductor for movement toward and away from said valve to communicate unseating movement to the latter or permit it to engage its seat, a stem connected with said disk, a tubular member having a swivel connection with said fluid conductor and constituting the connection between the fluid conductor and the hose, said stem having a right angular extremity protruding into said tubular member to impart rotary movement to the disk upon movement of the tubular member on its swivel connection.

In testimony whereof I affix my signature in the presence of two witnesses.

ANSON T. DEWEY.

Witnesses:
HAZAL B. McHENRY,
ALEX. J. WEDDRIK, JR.